Patented Aug. 21, 1951

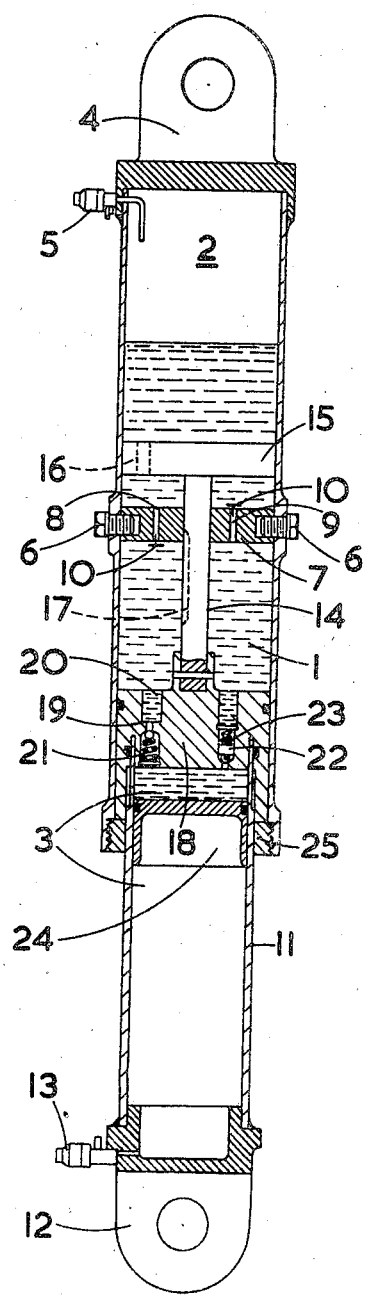

2,564,790

UNITED STATES PATENT OFFICE 2,564,790

SHOCK ABSORBER

George Orloff, Cheltenham, and Christopher Bernard Vere Neilson, Fearnhead, near Warrington, England, assignors to Electro-Hydraulics Limited, Warrington, Lancashire, England Application February 25, 1948, Serial No. 10,874
In Great Britain July 16, 1946

Section 1, Public Law 690, August 8, 1946
Patent expires July 16, 1966

2 Claims. (Cl. 267—64)

This invention relates to shock absorbers and concerns more particularly shock absorbers of the type in which fluid is contained in a deformable chamber in communication with a second chamber through an orifice or orifices which may be valved. The space in this second chamber is spring, i. e. resiliently, controlled in such a way that if the first chamber is deformed so as to force fluid through the orifices into the second chamber, the spring is strained, and will, on the removal of the deforming force or part thereof, exert a resultant restorative force and drive the fluid or part of it back into the first chamber. This spring may comprise the fluid itself which is compressible when subjected to pressure, or when the damping fluid is a liquid, a gas may constitute the spring. Again the spring may comprise deformable solids, e. g. coil or rubber springs, separated from the fluid in the shock absorber, e. g. by a floating piston.

This invention is concerned with providing a shock absorber of the type described which is particularly suitable for use in aircraft undercarriage equipment. It is appreciated that when brakes are suddenly applied during taxying to the main wheels of a tricycle undercarriage, the aircraft tends to pitch forward onto the nose wheel. The pitching inertia of the machine applies slow closure to the nose wheel shock absorber, and the kinetic energy of the aircraft, due to the pitching, must be absorbed in the nose wheel tyre and the shock absorber. As the movement is slow, the damping effect, due to the orifices in the shock absorber, is small, and this kinetic energy is, therefore, normally absorbed only by the tyre and the spring in the shock absorber, e. g. due to the compression of a volume of air. As the energy that can be absorbed in this way is less than that which would be absorbed by the damping orifices and air compression in normal closure, it frequently happens that either the spring in the shock absorber is compressed to give an excessive reaction, or more commonly that the shock absorber abutment faces close, so that it forms a rigid strut, with consequent undesirable results.

In a shock absorber of the type described according to the present invention there is provided a third chamber which is also spring controlled and is in valved communication with the deformable chamber, the arrangement being such that in the event of fluid pressure in the deformable chamber rising to a predetermined level, further damping is effected by open communication between the deformable and third chambers.

Preferably a relief valve is provided between the deformable or first chamber and the third chamber, the setting of the relief valve and the pressure in the third chamber being such that when once these pressures have been reached in the first chamber, a relatively large amount of fluid may pass from the first chamber to the third chamber without any considerable increase in the pressure in the first chamber.

One form of construction according to this invention and as applied to an oleo-pneumatic shock absorber is illustrated in the accompanying drawing which shows the shock absorber in section. Referring to the drawing the shock absorber comprises a main cylinder, which comprises a first chamber 1 which is deformable in length by means of a sliding piston and is filled with oil. The second chamber comprises a space 2 containing, or mainly containing, compressed air which acts as a spring, and the third chamber comprises a further space 3 containing, or mainly containing, compressed air which acts as another spring.

The main cylinder is formed at one end to retain a fluid-tight attachment 4 and an inflation valve 5, and within the cylinder, dividing chambers 1 and 2, is fixed, for example by fluid-tight screws 6, a transverse diaphragm or partition 7 provided with damping orifices 8, 9, each controlled by a flap or check valve 10, one on one side of the diaphragm and the other on the other side, capable of establishing communication with the second chamber. Within the cylinder is mounted a sliding piston structure assembly which comprises a hollow piston rod extension projecting through the open end of the cylinder and to which is secured a fluid-tight attachment 12 is provided with a secondary inflation valve 13. The hollow piston rod 11 which encompasses the third chamber 3 terminates in a piston 18 within the cylinder to which piston is secured a counter piston rod 14 extending axially of the cylinder 1 and passing through the fixed diaphragm 7 to a counter piston 15 in the second chamber 2, the counter piston 15 being provided with one or more free ports 16, establishing the necessary communication between the first and second chambers; the counter piston rod 14 is grooved over a portion of its length as at 17 so that, on movement of the sliding assembly in the cylinder, access from one side of the diaphragm to the other may also be provided through the said groove 17 in the counter piston rod. The piston 18 is provided with a spring loaded relief valve 19 communicating through a relief port 20 from chamber 1 to chamber 3.

The piston is also provided with a return port 22 similarly communicating from chamber 3 to chamber 1, which port is provided with a non-return check valve 23 which may be spring loaded. Within the hollow piston rod is a free or floating piston 24, which divides the fluid space from the air space, and is provided with packings, the sliding assembly being retained within the main cylinder by means of a suitable retaining member 25. Alternatively this piston 24 may be attached to the counter piston by means of the piston rod which slides through the main piston in such a way that the counter piston floats with the floating piston. In the chamber 2, as well as in the chamber 3, the oil may be separated from the compressed air by a floating piston or a bellows device.

The shock absorber is filled with liquid, to a predetermined liquid level above the counter piston 15, and air under pressure is introduced through the inflation valve 5 into the main cylinder 1 above the liquid level after the admittance of compressed air to the hollow piston rod 11 through its inflation valve 12.

On normal closure of the shock absorber at the designed speed, the closing force is resisted initially by the pressure in the fluid in the first chamber 1, due to the damping of the orifice 9 between it and the second chamber 2 and when the closing speed, and, therefore, the damping is reduced, by the pressure which has been developed by the further compression of the air in the second chamber. If the pressure in the first chamber rises, due to too rapid a closure, and, therefore, too great a damping resistance in the orifice 9, between it and the second chamber, the relief valve 21 between the first chamber 1 and the third chamber 3 will open and admit fluid into the third chamber, allowing closure to continue without further substantial increase in fluid pressure in the first chamber, and, therefore, without further substantial increase in reaction. Likewise if the closure, though slow, is continued until the pressure of the compressed air in the second chamber 2 reaches the same limit, fluid will again pass from the first chamber to the third chamber, allowing closure to continue without further substantial increase in reaction. On extension of the shock absorber, the spring pressure in the third chamber is sufficient to drive fluid back from it through the return port 22, past the check valve 23 and into the first chamber. Spring pressure in the second chamber 2 ultimately will force liquid from this chamber through the damping orifice 10 to restore the parts to their normal positions.

In a modified form according to the invention, the main cylinder space is filled with liquid which is compressed by means of a sliding rod and partially displaced through damping orifices to a second space behind the piston head. In this case a relief valve is provided from the fluid space in front of the piston head discharging into a third chamber likewise spring controlled in such a way that when a certain pressure is reached in the fluid in the first chamber some of the fluid may pass into this third chamber. On restoration of normal pressures in the first chamber the spring in the third chamber will drive the fluid back through an alternative non-return path as described above.

What we claim is:

1. In a shock absorber, a cylinder having one closed end and one open end; a transverse partition in said cylinder fixed with respect to the cylinder walls and dividing said cylinder into two chambers, the first chamber being on the side of said partition adjacent the open end of said cylinder and the second chamber being between said partition and the closed end of said cylinder; a piston mounted to reciprocate in the portion of said cylinder between said partition and the open end of said cylinder and forming one end wall of said first chamber; a hollow extension secured to said piston and projecting through the open end of said cylinder and being closed at its outer end to provide a third chamber; liquid filling said first chamber, a portion of said second chamber adjacent said partition, and a portion of said third chamber adjacent said piston; resilient means interposed between the liquid in said second chamber and the closed end of said cylinder; resilient means interposed between the liquid in said third chamber and the outer end of said extension; a first damping orifice in said partition for providing for flow of liquid from said first chamber to said second chamber; a first check valve for enabling flow of liquid from said first chamber through said first damping orifice to said second chamber but for preventing reverse flow through said first orifice; a second damping orifice in said partition for providing for flow of liquid from said second chamber to said first chamber; a second check valve for enabling flow of liquid from said second chamber through said second damping orifice to said first chamber but for preventing reverse flow through said second orifice; a relief port in said piston for providing for flow of liquid from said first chamber to said second chamber; a spring loaded relief valve for enabling flow of fluid from said first chamber through said relief port to said third chamber but for preventing reverse flow through said relief port; a return port in said piston for providing for flow of liquid from said third chamber to said first chamber; and a check valve for enabling flow of liquid from said third chamber to said first chamber but for preventing reverse flow through said return port.

2. In a shock absorber, a cylinder having one closed end and one open end; a transverse partition in said cylinder fixed with respect to the cylinder walls and dividing said cylinder into two chambers, the first chamber being on the side of said partition adjacent the open end of said cylinder and the second chamber being between said partition and the closed end of said cylinder; a main piston mounted to reciprocate in the portion of said cylinder between said partition and the open end of said cylinder and forming one end wall of said first chamber; a hollow extension secured to said main piston and projecting through the open end of said cylinder and being closed at its outer end to provide a third chamber; a counter piston reciprocable in said second chamber; a free port extending through said counter piston; a piston rod extending axially of said cylinder through said partition and connecting said counter piston to said main piston; liquid filling said first chamber, a portion of said second chamber adjacent said partition, and a portion of said third chamber adjacent said main piston; resilient means interposed between the liquid in said second chamber and the closed end of said cylinder; resilient means interposed between the liquid in said third chamber and the outer end of said extension; a first damping orifice in said partition for providing for flow of liquid from said first chamber to said second chamber; a first check valve for enabling flow of liquid from said first chamber through said first damping orifice to said second chamber but for preventing reverse flow through said first orifice; a second damping orifice in said partition for providing for flow of liquid from said second chamber to said first chamber; a second check valve for enabling flow of liquid from said second chamber through said second damping orifice to said first chamber but for preventing reverse flow through said second orifice; a relief port in said main piston for providing for flow of liquid from said first chamber to said second chamber; a spring loaded relief valve for enabling flow of fluid from said first chamber through said relief port to said third chamber but for preventing reverse flow through said relief port; a return port in said main piston for providing for flow of liquid from said third chamber to said first chamber; and a check valve for enabling flow of liquid from said third chamber to said first chamber but for preventing reverse flow through said return port.

GEORGE ORLOFF.
CHRISTOPHER BERNARD VERE NEILSON.

REFERENCES CITED

The following references are of record in the file of this patent:

UNITED STATES PATENTS

| Number | Name | Date |
|---|---|---|
| 2,348,160 | Thornhill | May 2, 1944 |

FOREIGN PATENTS

| Number | Country | Date |
|---|---|---|
| 848,685 | France | Nov. 3, 1939 |
| 866,370 | France | Aug. 4, 1941 |